July 8, 1952   E. E. EATON ET AL   2,602,346
TRANSMISSION
Filed Feb. 21, 1948   3 Sheets-Sheet 2

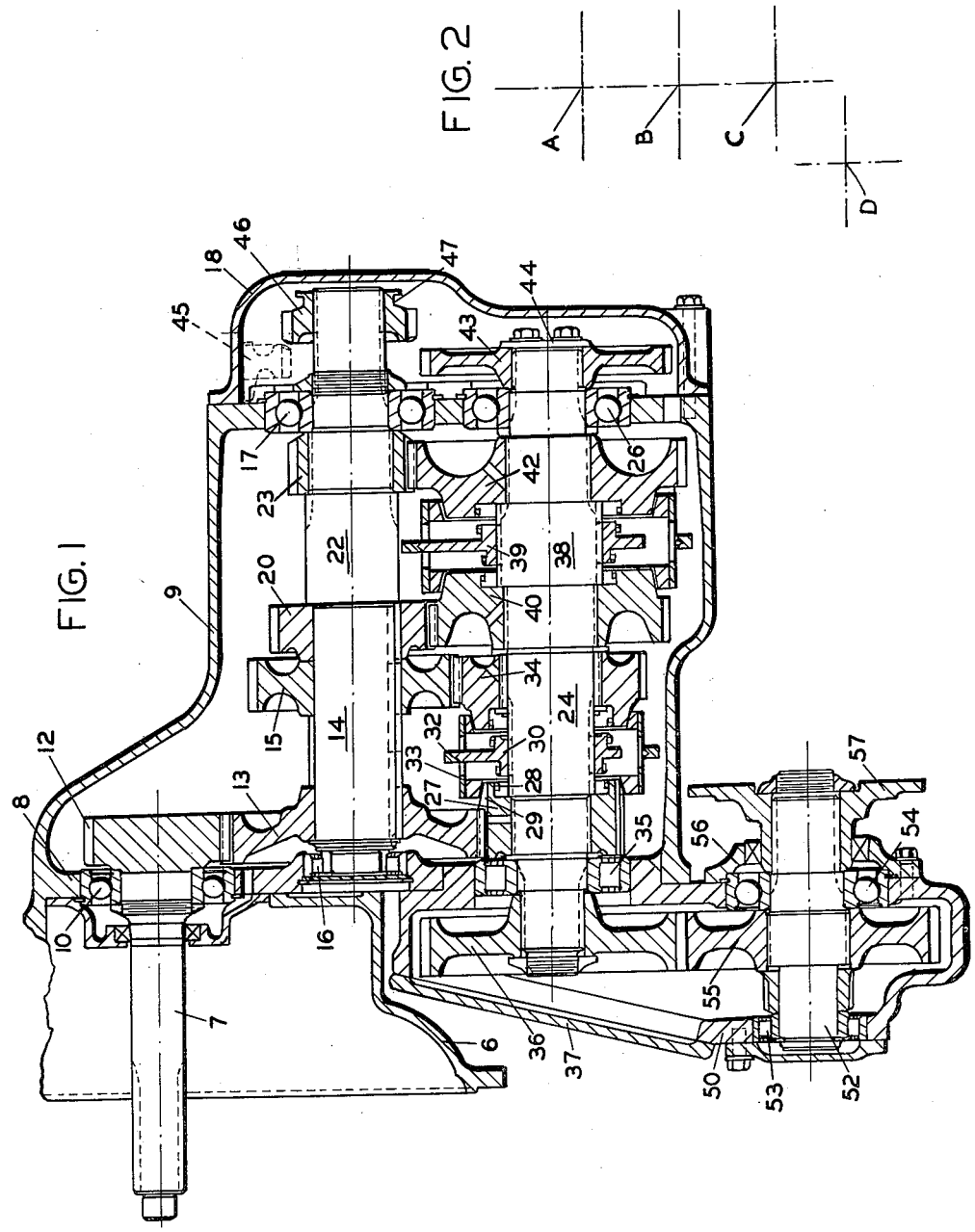

INVENTOR.
ERNEST E. EATON
F. MARION HOGUE
BY
*Walter E. Schirmer*

ATTY.

Patented July 8, 1952

2,602,346

UNITED STATES PATENT OFFICE 2,602,346

TRANSMISSION

Ernest E. Eaton, Niles, and Francis Marion Hogue, Barrien Springs, Mich., assignors to Clark Equipment Company, Buchanan, Mich., a corporation of Michigan Application February 21, 1948, Serial No. 10,134

7 Claims. (Cl. 74—333)

This invention relates to transmissions and is particularly directed to a transmission design for use in trucks, busses, and similar motor vehicles. It has been a problem especially in the design of transmissions for commercial vehicles, such as busses and the like, having rear engine drives, to provide an arrangement where the transmission is of such axial length as to eliminate offsetting of the differential housing of the drive axle and to provide a propeller shaft of sufficient length to accommodate the flexing required because of the relative oscillations between the drive axle and the mounting of the transmission.

The present invention provides a novel solution to this problem by utilizing a construction in which the drive shaft from the clutch carries a pinion for driving a transmission shaft disposed therebelow, with the counter shaft of the transmission disposed below the transmission shaft and having a drop set of gears at the forward end thereof, whereby the propeller shaft extends beneath the transmission housing thus gaining the additional length of the housing, and the housing itself, is shortened so as to fit within the spacial requirements required in vehicles of this type.

Still a further feature of the present invention is the provision of means for producing a right angle or offset drive in a transmission of this general type, utilizing the same transmission gearing and providing the output shafts driven thereby, which may be located in a position below the bell housing for the clutch or in other laterally offset positions, depending upon the location of the transmission in the vehicle and the location of the axle with respect thereto. In this connection the present invention contemplates a simplified transmission construction of the synchronous type with the drive transmitting output shaft for the transmission located below and forwardly of the transmission housing, and with the housing itself, arranged to be located below the center line of the bell housing insofar as the gearing portion thereof is concerned.

Other objects and advantages of the present invention, such as economy of construction, simplicity of design and arrangement, and adaptability to various operating conditions, will become more fully apparent to those skilled in the art by referring to the detailed specification and drawings forming a part hereof and which disclose a preferred form of the present invention.

In the drawings:

Figure 1 is a vertical sectional view through a transmission embodying the present invention.

Figure 2 is a diagrammatic view showing shaft locations of the transmission shown in Figure 1.

Figure 3:
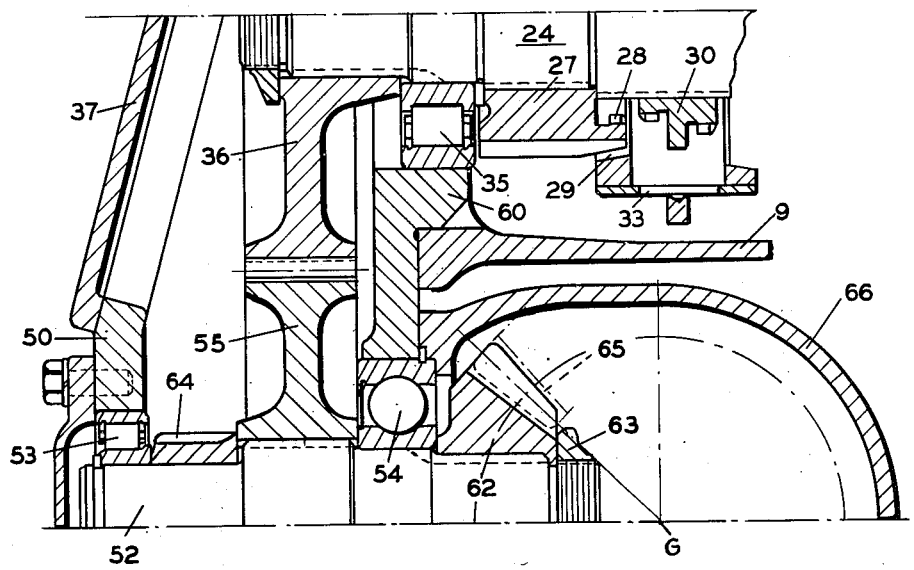
Figure 3 is a detail vertical sectional view of a modification of the synchronizer drive portion of the transmission shown in Figure 1.

Referring now particularly to Figure 1 which discloses the basic form of the transmission, there is provided a bell housing 6, which is adapted to receive the clutch by which the engine is connected to the transmission and which contains the clutch driven shaft 7, extending through the forward wall 8 of a transmission housing, indicated generally at 9, and is supported therein by means of the bearing assembly 10. The shaft 7, has an enlarged pinion portion 12, formed at the end thereof, which projects into the transmission housing, the housing being formed with a forwardly extending recessed portion for receiving the pinion 12. This pinion is adapted to have constant meshing engagement with a gear 13, splined or otherwise suitably secured upon a transmission main shaft 14, which gear is mounted in axially spaced relation to a second gear 15, carried on the same shaft.

The shaft 14, at its forward end, is supported by means of the roller bearing assembly 16, in the forward wall 8 of the transmission, and at its rear end is supported in the ball bearing assembly 17 in the rear end wall of the transmission, the shaft projecting therebeyond into a secondary housing formed by the member 18, bolted or otherwise secured over the rear end wall of the housing 9.

The shaft 14 carries a third gear member 20, splined or otherwise non-rotatably secured thereon, and seated against an enlarged portion 22 of the shaft, which, adjacent the bearing assembly 17, is adapted to receive the gear element 23, also non-rotatably secured to the shaft.

The location of the shaft 7 is shown diagrammatically in Figure 2 at A, and it will be noted that the center line of the shaft 14 is indicated at the point B. The counter shaft of the transmission, generally indicated at 24, is disposed below the shaft 14, its center line being located at the point C in the diagram of Figure 2.

The shaft 24 projects at opposite ends through the forward end wall 8 of the transmission housing and through the rear end wall thereof, being supported at the rear end of the housing 9 by the ball bearing assembly 26. Mounted upon the shaft 24 and in constant meshing engagement with the gear 13 is a gear member 27, having overhanging internal clutch teeth 28, and a conical friction cone surface 29. The gear 27 is rotatably mounted upon the shaft 24 and is adapted to be clutched or declutched therefrom by means of the clutch element 30, having extending radial arm portions 32, projecting through a synchronizer sleeve 33, carrying at its opposite ends, synchronizer cones adapted to engage the conical surface 29 or the corresponding surface of the rotatably mounted gear member 34, mounted in position to be in constant meshing engagement with the gear 15 of shaft 14.

The operation of this type of synchronizing mechanism is believed apparent, and it is obvious that either of the gears 27 or 34 may be selectively clutched to the shaft 24 by actuation of the clutch member 30.

Forwardly of the gear member 27, the shaft 24 is supported in the roller bearing assembly 35, and carries on its projecting end a large spur gear member 36, enclosed within an extension of the housing 9, having an opening through which the gear 36 may be assembled, which opening is adapted to be closed by the closure plate 37.

The shaft 24 is also provided with an enlarged splined portion 38, carrying a clutch member 39 of the synchronizer type, which is adapted to selectively clutch either the gear 40 of the gear 42 to the shaft 24, depending upon the direction of shift of the clutch member 39. The gear 40 is in constant meshing engagement with the gear 20 of the shaft 14, and the gear 42 is in constant mesh with the gear portion 23 of the shaft 14.

The projecting rear end of the shaft 24 is enclosed within the cap member 18 and carries a gear 43, splined thereon and held in position by an end plate 44. The gear 43 is in constant meshing engagement with a reverse idler gear, indicated in dotted lines at 45, and shown out of position for the sake of clarity. Mounted on the projecting end of the shaft 14 and splined for axial shifting movement thereon, is a reverse gear 46, having a yoke collar 47 for engagement by a suitable shift control fork, which is adapted when reverse drive is required, to be shifted to the left from the neutral position shown in Figure 1, to drive the idler gear 45 and consequently drive the shaft 24 through gear 43 in a direction reverse to that produced when any one of the gears 27, 34, 40, or 42 is coupled to the shaft.

The depending part of the forward housing extension 50, is adapted to have a shaft 52 journalled therein by means of the roller bearing 53 and the ball bearing 54. The shaft 52, carries a gear 55, splined thereon and is in constant meshing engagement with the gear 36, driven by the shaft 24. The shaft 52, in turn, projects rearwardly of the housing extension 50, through the bearing cap 56, and has splined on the outer end thereof, the companion flange 57 of a universal joint assembly, by means of which this shaft may be connected to a propeller shaft leading to the drive axle of the vehicle. It will be apparent from the construction thus far described, that a relatively compact and simplified transmission assembly has been provided, whereby lowering of the gear case is provided through the drop gear arrangement from pinion 12 to shaft 14 and by the use of the forward extension 50 on the housing 9 with the drop gears 36—55, a further reduction may be effected and the final drive output shaft 52 is disposed completely below the transmission housing and adjacent the forward end thereof, thus locating it below and to one side of the transmission housing and preferably centrally relative the longitudinal center of the vehicle, so that the drive through the propeller shaft can be into the differential carrier located centrally of the drive axle.

It will be apparent from the diagram in Figure 2 that the angular location of the center line D of shaft 52 with respect to center line of shaft 14 and 7, may be varied, thereby allowing the output shaft 52 to be located in various desired points relative the longitudinal center of the vehicle.

To enable the present transmission as described in Figure 1 to be used in the case of a transversely mounted engine and transmission assembly, where the output shaft of necessity must be at right angles to the axial position of the shafts in the transmission and clutch, a modification of the structure shown in Figure 1 readily adapts this transmission to this purpose.

Considering now in detail Figure 3, similar reference numerals are employed to designate similar parts in the two constructions. It will be noted from the enlarged view of Figure 3, that the housing extension 50, comprises a separate housing element, having flange portions or pilot portions 60 disposed within the open forward wall of the housing 9, and which may be held therein by studs, screws, or in any other desired manner. The shaft 52, in this form of the invention, is again supported by the bearing assembly 54, but carries a beveled gear or pinion 62, held against axial movement by the lock nut 63, and splined or otherwise keyed against rotation relative the shaft 52.

This shaft, adjacent its forward roller bearing support 53, is adapted to carry a small speedometer gear 64, for driving the speedometer of the vehicle. The bevel gear 62 has constant meshing engagement with a gear shown diagrammatically at 65, this being a corresponding bevel gear having the axis of its shaft located at the point G in Figure 3. The shaft carrying the gear 65 consequently is at right angles to the axis of the shaft 52, and a suitable spherical housing member 66, which encloses the gears and is bolted to the housing 50 on the rear face thereof below the housing 9.

Thus it will be seen that the shaft, indicated at G, extends beneath the transmission housing 9 in a direction at right angles to the axial extent thereof and consequently provides a right angle drive at a point closely adjacent the forward end of the transmission housing 9. This is very desirable as it accommodates a transversely mounted engine assembly to a construction in which the output shaft to the drive axle is located substantially in the center of the vehicle so as not to require offsetting of the differential housing.

Figure 4:
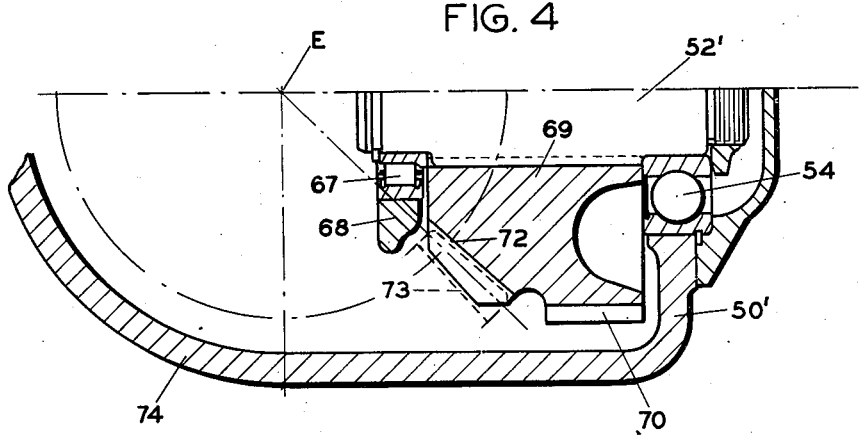
Figure 4 is a corresponding modified sectional view showing a different form of power output connection.

In Figure 4 a still further modified construction is provided in which the offset of the output shaft is on the opposite side of the drop gear and provides for the output shaft being located beneath the bell housing and entirely forwardly of the transmission housing. In this form of invention, the shaft 52' corresponding to the shaft 52 of Figures 1 and 3, is supported in the housing 50' by means of the ball bearing assembly 54 and a roller bearing assembly 67 carried in a bearing bracket 68. The gear 69, mounted upon the shaft is a compound gear having the gear portion 70 meshing with the gear 36, and having a bevel gear portion 72 formed integrally therewith and facing to the left as viewed in Figure 4. Meshing with this bevel gear portion 72 is a mating bevel gear 73, disposed at right angles thereto and having the axis of rotation located at the point E of Figure 4, extending at right angles to the axis of the shaft 52'.

Thus it will be seen that in this form of the invention, the output shaft is disposed on the opposite side of the gear 69 from the form shown in Figure 3, and provides for an output shaft extending beneath the bell housing and thus considerably forward of the transmission housing 9. A suitable housing member 74 encloses the output shaft gear and is bolted or otherwise secured to the housing 50' to provide support for the gear 73 and its associated bearings.

Figure 5:
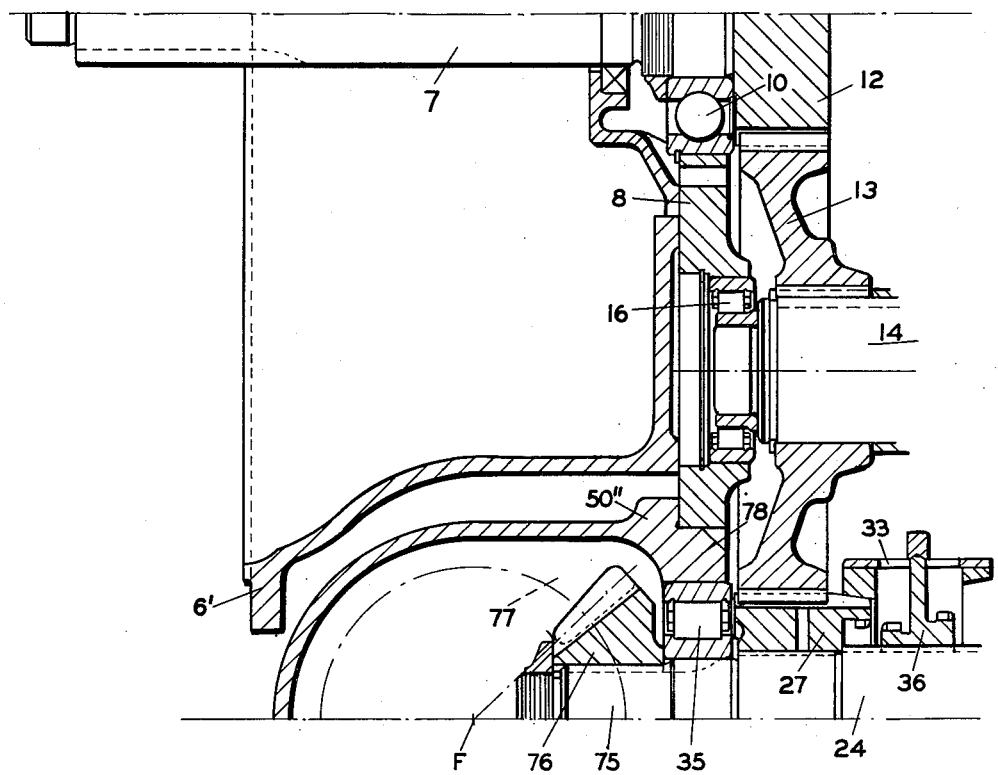
Figure 5 is a still further modified construction for the power output shaft.

Considering now the construction shown in Figure 5, it is desired in this construction to raise the location of the output shaft with reference to the transmission housing and yet to provide for it being located forwardly of the transmission and directly beneath the bell housing. In this form of the invention, similar reference numerals are employed to indicate parts corresponding to those found in Figure 1, and it will be noted that the bell housing 6' in this form of the invention is somewhat similar to the bell housing 6 but is extended forwardly for a purpose to be described in detail hereinafter.

The shaft 24, in this form of the invention, has its forwardly projecting end 75 provided with a bevel gear 76, splined or otherwise non-rotatably secured thereon, which is adapted to have meshing engagement with a bevel gear, indicated diagrammatically at 77, carried by an output shaft having its center located at the point indicated at F. A suitable housing 50'' is mounted by means of its pilot flange 78 in the opening of the forward wall 8 of the housing 9, similar to the manner in which the housings 50 and 50' are mounted and provides a closure for the output shaft gear 77 and its associated bearings.

It will be noted here that the axis of the gear 77 is at right angles to and co-planar with the axis of the shaft 24, whereas in the previous embodiments utilizing a right angle drive, the axis of the output shaft gear was coaxial with the shaft 52. Thus it has been raised in position and disposed immediately below the bell housing but completely forwardly of the transmission housing.

In any of the disclosures thus far described, it will be noted that the transmission housing 9 and its associated shafts and gears therein, are all identical and that the only changes required for the various positions of the output shafts is the provision of various types of housings, such as the housing 50, and revision of the drop gears and shaft arrangement 52. Thus a standardized type of transmission can be employed, and the particular changes made for various models of trucks or other commercial vehicles, thus gaining the advantage of volume production on the main portion of the transmission and yet providing considerable flexibility in the adaptability of the mechanism to various types of driving arrangements.

We are aware that various changes may be made in certain details of the present construction without in any manner departing from the underlying principles thereof, and we therefore do not intend to be limited except as defined by the scope and spirit of the appended claims.

We claim:

1. In a transmission construction, a bell housing, a transmission housing mounted to said bell housing, said transmission housing receiving a clutch driven shaft extending from said bell housing and having a pinion within said transmission housing, a transmission main shaft in said transmission housing below the plane of said driven shaft and driven from said pinion, a countershaft in said transmission housing below said main shaft, selectively operable gear trains between said main shaft and countershaft, said countershaft projecting forwardly of said transmission housing beneath said bell housing, a detachable transfer housing mounted to said transmission housing below said bell housing, a gear on said countershaft extension within said transfer housing, reverse gear means between said main shaft and countershaft beyond the rear end wall of said transmission housing, and cover means on said rear wall enclosing said gear means.

2. In a transmission construction, a bell housing, a transmission housing mounted to said bell housing, said transmission housing receiving a clutch driven shaft extending from said bell housing and having a pinion within said transmission housing, a transmission main shaft in said transmission housing below the plane of said driven shaft and driven from said pinion, a countershaft in said transmission housing below said main shaft, selectively operable gear trains between said main shaft and countershaft, said countershaft projecting forwardly of said transmission housing beneath said bell housing, a detachable transfer housing mounted to said transmission housing below said bell housing, a gear on said countershaft extension within said transfer housing, an output shaft journaled in said transfer housing, the axis of said output shaft lying below and laterally of the axis of said countershaft, gear means within said transfer housing between said gear on said countershaft extension and said output shaft, reverse gear means between said main shaft and countershaft beyond the rear end wall of said transmission housing, and cover means on said rear wall enclosing said gear means.

3. The combination of claim 2 including bevel gearing enclosed within said transfer housing and driven from said output shaft for driving at right angles to the axis thereof.

4. The combination of claim 2 including bevel gearing on said output shaft, and a bevel gear driven thereby and disposed forwardly of said transmission housing and beneath said bell housing.

5. The combination of claim 2 including a bevel gear on said output shaft, a second bevel gear driven thereby, said bevel gears being disposed rearwardly of said gear means driving said output shaft and below the forepart of said transmission housing.

6. The combination of claim 2 including right angle driving means driven from said output shaft and disposed below the forepart of said transmission housing.

7. The combination of claim 2 including right angle driving means driven from said output shaft and disposed below said bell housing.

ERNEST E. EATON.
F. MARION HOGUE.

(References on following page)

REFERENCES CITED

The following references are of record in the file of this patent:

UNITED STATES PATENTS

| Number | Name | Date |
|---|---|---|
| 1,859,788 | Padgett | May 24, 1932 |
| 1,933,540 | Brown | Nov. 7, 1933 |
| 1,991,694 | Peterson | Feb. 19, 1935 |
| 2,118,811 | Fageol | May 31, 1938 |
| 2,138,618 | Seyerle | Nov. 29, 1938 |
| 2,194,929 | Eckert | Mar. 26, 1940 |
| 2,300,502 | Haltenberger | Nov. 3, 1942 |
| 2,306,902 | Rabe | Dec. 29, 1942 |
| 2,443,313 | Gerst | June 15, 1948 |
| 2,446,854 | Schroeder | Aug. 10, 1948 |

FOREIGN PATENTS

| Number | Country | Date |
|---|---|---|
| 502,563 | Great Britain | Mar. 20, 1939 |
| 839,759 | France | Apr. 12, 1939 |